May 19, 1959     A. M. MARKS     2,887,566
GLARE-ELIMINATING OPTICAL SYSTEM
Filed Nov. 14, 1952     6 Sheets-Sheet 1

Inventor
Alvin M. Marks
by his Attorney
Albert F. Kronman

Inventor.
Alvin M. Marks
by his Attorney
Albert F. Kronman

May 19, 1959     A. M. MARKS     2,887,566
GLARE-ELIMINATING OPTICAL SYSTEM
Filed Nov. 14, 1952     6 Sheets-Sheet 3

Inventor:
Alvin M. Marks
by his Attorney
Albert F. Kronman

May 19, 1959 — A. M. MARKS — 2,887,566
GLARE-ELIMINATING OPTICAL SYSTEM
Filed Nov. 14, 1952 — 6 Sheets-Sheet 4

Inventor:
Alvin M. Marks
by his Attorney
Albert F. Kronman

May 19, 1959 A. M. MARKS 2,887,566
GLARE-ELIMINATING OPTICAL SYSTEM
Filed Nov. 14, 1952 6 Sheets-Sheet 5

Inventor:
Alvin M. Marks,
by his Attorney
Albert F. Kronman

United States Patent Office 2,887,566
Patented May 19, 1959

2,887,566

GLARE-ELIMINATING OPTICAL SYSTEM

Alvin M. Marks, Beechhurst, N.Y., assignor to Marks Polarized Corporation, New York, N.Y., a corporation of New York Application November 14, 1952, Serial No. 320,440

18 Claims. (Cl. 240—9.5)

This invention relates to a glare eliminating optical system such as may be used on automobiles and other vehicles.

The most successful glare eliminating systems heretofore devised have been those employing polarized headlights and visors in the nature of analyzers for selectively eliminating the glare from oncoming headlights. Presently known systems, however, have received very limited acceptance because of their inherent deficiencies.

One of the difficulties encountered where linear (crystal) polarizers have been used in front of headlamps is the excessive and dangerous loss of illumination. These polarizers transmit as polarized light only 30–40 percent of the light input, the remainder of the light energy being absorbed by the polarizing medium and irretrievably lost. In order to overcome the loss of illumination with low efficiency polarizing mediae, it is necessary to increase the luminous flux output of headlights by a factor of at least two and one-half times to provide the required brightness.

A further need for an increase of two and one-half times in the headlight power occurs when a polarizing visor is used in the known systems. The use of the analyzer causes a sixty to sixty-five percent loss of the original input illumination.

When cars were equipped with such glare preventing systems, drivers of cars and pedestrians who are not using analyzers to protect them are subjected to a far greater glare and danger than at present. The higher intensity light output requires greater electric currents to the lights, larger batteries and generators and heavier wiring. Installation of these elements would require rewiring each car and the further expense of installing large size generating equipment in both old and new cars.

The importance of a system which will enable all cars to adopt it without excessive cost can be seen from the fact that the polarized nonglare system, to be effective, must be widely adopted in the shortest possible time.

Accordingly it is an object of the present invention to provide a highly efficient glare eliminating headlight and visor system which will be free of the defects and shortcomings of presently known structures.

Another object of the present invention is to provide a system in which the headlights are maintained at the standard candle power now permitted by law, so that no additional burden will be imposed upon the vision of observers, both drivers and pedestrians, not equipped with suitable polarized shields.

It is an object of this invention to produce a highly efficient headlight, capable of polarizing light while maintaining the standard level of illumination, now required by law, and without overloading the generator and wiring systems of present-day cars.

A further object is to provide a system of polarizing headlights and visors, which will be flexible enough to afford protection for a wide variety of driving conditions.

Another object is to provide a polarizing means, capable of polarizing high intensity sources of light, without overheating.

A feature of the present invention is its high efficiency polarized headlight assembly hereinafter called a multi-layer reflux type polarized headlight.

Another feature of the present invention is a polarized visor which conforms to the statistically average approach pattern of oncoming automobile headlights.

A further feature of the present invention is its prism polarizing device capable of polarizing light with a high degree of efficiency, in conjunction with a parabolic reflector and depolarizing material.

Another feature of the present invention is a combined prism, multi-layer polarizer and depolarizer.

Another feature of the present invention is its light depolarizing means.

A further feature of the present invention is its automatic or controlled means for the lowering or raising of polarized visors during night driving.

The invention consists of the construction, combination and arrangement of parts, as herein illustrated, described and claimed.

In the accompanying drawings, forming part hereof, are illustrated three forms of embodiment of the system, in which drawings similar reference characters designate corresponding parts, and in which.

In the present specification, the term plane of polarization follows the old convention which makes the plane of polarization from a light beam such that it is coincident with the magnetic vector of the said light beam; that is, at right angles to the electric vector thereof.

Figures 1, 1A, 3:
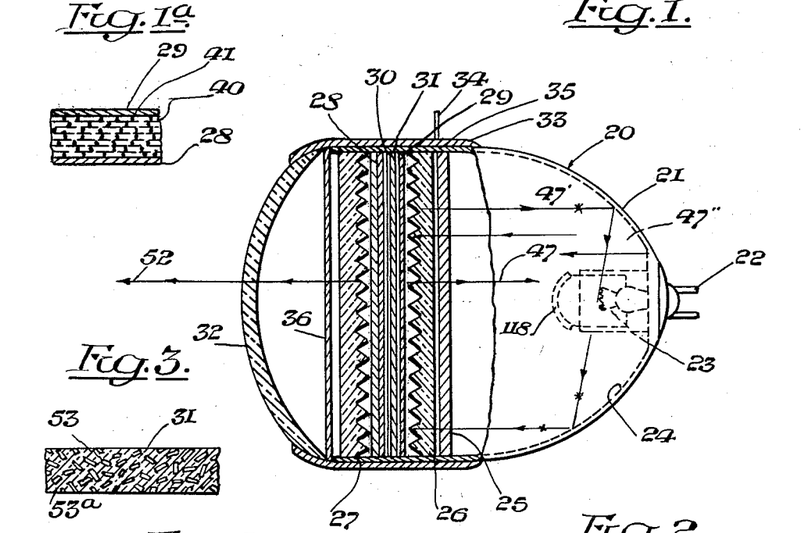
Figure 1 is a view in vertical section of a complete embodiment of a reflux type headlight made in accordance with the present invention.
Figure 1a is a fragmentary view somewhat enlarged showing a flake-like type polarizer in accordance with the present invention.
Figure 3 is a fragmentary view, somewhat enlarged, of a depolarizing member made in accordance with the present invention.

Referring to Fig. 1, there is shown a headlight 20 of the sealed beam type and a parabolic reflector 21, having an internal reflecting surface 24. A filament 23 is activated by electrical current passing through the bayonet plug having terminals 22. The headlight 20 preferably has a plane face 25, and in the view shown is provided with a prism plate 26, called the inner prism. The prism 26 directs the light in the manner shown in Fig. 2, so that light rays are caused to fall upon a multi-layer polarizer medium 30, after traversing a depolarizer 31. After passing through the polarizing layer 30, the rays are bent back into their original direction parallel to the axis of the parabolic mirror 21 by an outer prism plate 27, and proceed along the direction indicated at 52, having been polarized by passing through the multi-layer polarizer 30.

The multi-layer polarizer 30, in contradistinction to a linear or crystal type of polarizer, which polarizes by transmitting one component and totally absorbing the remainder of the light, polarizes by reflection and refraction. This polarizer is formed of between two and twenty layers, depending on the index of refraction of the layers and the percentage of polarization required, preferably of a suitable material having a high index of refraction particularly designed to coact with the prism structure, which will be hereinafter more specifically described.

Since both the multi-layer polarizing layers and the depolarizer are quite thin, they may be supported by glass plates 28 and 29 comprising plane parallel glass plates of a suitable high index of refraction. The support plates' index of refraction is selected to match that of the multilayer polarizer, which is particularly chosen to have a specific high index of refraction, in order to perform with maximum efficiency in the system, as will hereinafter be more fully described.

The efficiency of the multi-layer reflux type headlight herein disclosed, appears to be of the order of seventy-five percent to eighty-five percent while the degree of polarization may exceed ninety-five to ninety-nine percent.

Where a higher polarizing ratio is required, a linear type polarizer 36, such as that described in Patent #2,104,949, may be employed in front of the reflux polarizing system herein shown. This crystal type of polarizer has approximately eighty percent transmission to light previously polarized parallel to the plane of polarization. While the efficiency of the system will then drop from eighty percent to approximately sixty-four percent, the polarizing ratio may increase sufficiently in some cases to make the sacrifice of light and efficiency worth while. For most uses, however, the linear polarizing layer 36 need not be used, especially where the light transmission efficiency of the system is of greater importance than securing a very high percentage of polarization of light. The slight lack of complete polarization which will result from not using the crystal-polarizer 36 on the oncoming headlight will still afford a satisfactory measure of protection, while making it possible to see the oncoming vehicle without being blinded by glare.

After passing through an outer prism plate 27, the polarized rays of light are parallel to the axis of the system. A conventional type beam dispersing prism 32 is employed to spread the parallel beams of the headlight to the desired pattern for the illumination of the roadway and objects in front of the car.

The above headlight components are secured by means of a shell 33 comprising a metal cylinder 35 which is spun over in the front and in the rear to hold all the components together firmly in the position shown. A mounting plate 34 is secured to the retaining shell 33, by means of which the entire assembly may be mounted into the standard automobile socket for sealed-beam headlights.

Figure 2:
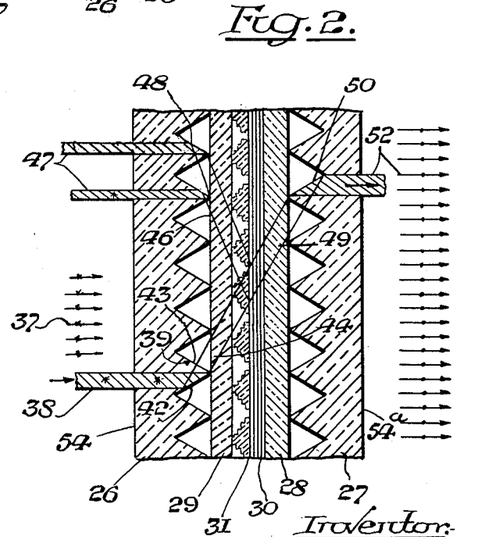
Figure 2 is a somewhat enlarged fragmentary cross sectional view of the reflux polarizing elements shown in Figure 1.

Referring to Fig. 2, there is shown the inner and outer prism plates 26 and 27; the multi-layer polarizer 30; the depolarizer 31; the retaining plates 28 and 29, and entering beams 38 which comprise a bundle of rays from the entering beam 37. The entering beams 38 comprise unpolarized light and are so indicated by the customary star-shaped designation.

Prism plate faces 26 and 27 may be coated with anti-reflection films 54 and 54a, to reduce the reflection of light back into the system, which reflection causes unnecessary circulation of the light, with consequent loss of efficiency.

The bundle of rays 38 from the ray 37 which is shown proceeding into the prism plate 26 is totally internally reflected at the face 42 of the prism 39. The apex angle of the member 39 is set at 60° for reasons which will be apparent from the following.

It has been found that an angle of incidence of 60° upon the multi-layer polarizer has certain advantages taken in combination with the specific prism shown. The advantages of using a high index multi-layer film are that fewer layers are required to achieve the high degree of reflectivity for obtaining a high percentage of polarized light. For example, in order to attain a high degree of polarization, it has been found that about twenty layers of material having an index of refraction, 1.50 are required. To attain approximately the same degree of polarization, only about fifteen layers are required with material having an index of refraction of 1.60, and only about twelve layers are required with an index of refraction of 1.7.

Where the index of refraction of 1.732 is employed, for which Brewster's angle is 60°, approximately fourteen layers 30 will suffice to attain a high order of polarization.

The layers 30 may be formed from the following suitable high index plastic materials cast into film form in the manner well known in the art.

For example, these films may be formed from solutions having the following composition:

*Example I*

| | Parts |
|---|---|
| Polystyrene | 45 |
| Columarone-indene resin | 45 |
| Diphenyl chloride plasticizer (Aroclor) | 10 |

*Example II*

| | Parts |
|---|---|
| Polystyrene | 45 |
| Solid diphenyl chloride (Aroclor) | 45 |
| Liquid diphenyl chloride plasticizer (Aroclor) | 10 |

The foregoing composition will give clear film having an index of refraction of approximately 1.65 and for which Brewster's angle of incidence is approximately 59°. This is only one degree from the angle of incidence provided by a 60° prism. Furthermore, a graph of percent of polarization of the transmitted beam plotted against the angle of incidence in the vicinity of Brewster's angle is quite flat, so that a change of one degree will not make a very great difference in the percentage of polarization (see Fig. 21).

As an alternative form, the layers 30 may be formed of thin layers of high index glass, known commercially as extra heavy flint glass, which can be readily produced having an index of refraction of 1.732, for which Brewster's angle is 60°

It has been found that the particular properties of the 60° prism, in combination with the multi-layer polarizer having Brewster's angle of 60°, is a particularly excellent combination for performing the functions of high degree of polarization with a maximum light transmittance. This combination is particularly effective for the reflux action, since the geometry of the system returns the unpolarized light in a direction parallel to the horizontal axis of the reflector, thereby facilitating its return to the polarizer.

Referring to Fig. 2, it will be seen that the incident bundle of rays 38 is reflected by total internal reflection by one of the faces 42 of the prims 39. The reflected beam then travels at normal incidence through the face 43 of the prism, and thereby suffers no refraction or bending. The beam emerges as indicated at 44, passes through the depolarizer 31, and then strikes the multi-layer polarizing member 30, when it undergoes multi-reflection. A portion indicated at 49 of the said beam 44 is transmitted and polarized in a plane normal to the plane of the paper. The beam 49 passes into the second prism plate 27, passing through normal to the initial face, and then is totally internally reflected at face 50 of the prism 27, being thereby redirected into a beam having a direction parallel to the initial direction of the incident light 37. The emergent beam 52 is polarized in a plane normal to the plane of the drawing.

The reflected beam portion 46 is polarized in the plane of the paper, and is reflected at the same angle of incidence, namely approximately 60°. This beam is again directed normal to the entering face of a prism on plate 26, whereupon it is again totally internally reflected by the opposite face of the prism 48 and redirected in beams 47 back parallel to the incident light 37, but traveling in an opposite direction. Since the beam 46 passes through the depolarizing layer 31, it is converted back to ordinary or unpolarized light before it reaches the interior of the reflecting chamber.

Referring to Fig. 1, unpolarized rays 47, 47', 47" shown in Fig. 1, return to the parabolic reflector 24, and are reflected through the focus of the parabola, where they may strike the spherical reflector 118 and then be redirected back through the focal point on to the parabolic reflector 24 again, and then will be in a position to repeat the process described in connection with the passage of the beam 38, shown in Fig. 2.

It will be understood that the initial beams 38 which may be said to contain one hundred parts of light in energy, is split at the polarizing layer 30 into a transmitted beam 49 containing approximately forty-five percent of the light energy, and a reflected beam 46 which contains another forty-five percent of the light energy. The returning rays 47 therefore contain approximately forty-five percent of the initial light energy. Upon being reflected back through the focus and returned to undergo the process above described again, the light is again available as unpolarized light which becomes a part of the incident beam 37. This beam 37 is again partly transmitted as an emergent beam 52 and partly again reflected back as rays 47.

A constant proportion of the light coming from the filament 23 is thus returned and allowed to travel forward again toward the polarizer 30 as an unpolarized beam. The result of the summation of the above processes, which is termed reflux polarization, is that the emergent beam 52 contains from seventy-five to eighty-five percent of the initial energy available for the beam; that is, without the prism multi-layer polarizer and depolarizer shown in Fig. 2.

The structure shown in connection with Fig. 1, but without the dispersing prism 32 will perform as a highly satisfactory projection polarized light source. This light source is useful in connection with polarized search-lights or motion picture apparatus for the projection of three dimensional images. Employing presently known linear polarizers for these purposes would result in so substantial a loss of light as to make them impractical. In addition, linear polarizers cannot withstand the excessively high temperatures in search light or motion picture installations. The presently disclosed device, on the other hand, is specifically adapted for these purposes, producing a high intensity source of polarized light.

While the polarizer shown and described in Figs. 1 and 2 has been referred to as comprising layers of a suitable material, it is within the purview of the present invention to form a polarizer in which the layers are made of a plurality of glass flakes 40, as shown in Fig. 1a. The glass flakes 40 are preferably of a thickness of between one and one hundred microns and of a flat dimension of the order of one-tenth to one millimeter. These flakes may be suspended in an air stream and floated downwardly in a uniform layer upon a glass cover plate 28 similar in effect to the uniform coating produced by snowfall. Interspersed with the flakes 40 may be a still finer and smaller proportion of a low melting point glass 41 known commercially as solderglass (Corning Glass Works).

After deposition, the flakes 40 are covered with a glass cover plate 29 and the entire assembly heated so as to cause a sintering or adhesion of the parts comprising the flakes 40, the solderglass 41 and the cover plates 28 and 29. Because of the low melting point of the solderglass 41, the selection of a suitable amount of heat for sintering will leave a large proportion of flat air spaces between individual flakes 40.

Referring again to Fig. 2, unnecessary refluxing action may be minimized, while increasing the transmission of the ray 38 in each case, by the elimination or reduction of surface reflections. This reduction may be accomplished by the employment of antireflection films 54 and 54a on the faces of the prism. However, these antireflection films must be so chosen that they do not permit the destruction of the property of internal reflection. This object may be accomplished by preparing the prisms 26, 27 out of a fairly high index material and by the employment of antireflection film having a correspondingly high index of refraction; that is, sufficiently high so that the property of internal reflection is not prohibited.

Referring now to Fig. 3, there is shown a novel depolarizing medium comprising an isotropic plastic sheet 31 containng suspended therein crystal material 53 which is transparent, birefringent, and which is randomly oriented. The index of refraction of the sheet 31 is preferably adjusted so that it is approximately the average index of refraction of crystalline materials. The crystalline material, for example, may comprise powdered mica flakes, which are transparent, and which have the three indices of refraction approximately 1.561, 1.590, 1.594. The sheet 32 may comprise a mixture of polystyrene, with a compatible resin to reduce the index of refraction approximately 1.59. As an example, the following composition may be used:

| | Parts |
|---|---|
| Polystyrene | 40 |
| Coumarone-indene resin | 40 |
| Dioctyl phthalate plasticizer | 10 |

This film may be cast as above described, having first mixed therein the mica powder. The solvent employed may be xylene, and the casting solution may contain from twenty to forty parts of the above composition.

Polarized light in traveling through the depolarizer 31, shown in Fig. 3, will encounter crystals 53 of varying thickness and of varying orientation, and the light entering as polarized light will emerge as randomly polarized light containng all degrees of ellipticity, the admixture of which will be effectively unpolarized light. This light will be capable of undergoing the process shown in Fig. 2, and the reflux rays 47 will correspond to ray 38 on their return trip from the parabolic reflector.

Figure 4:
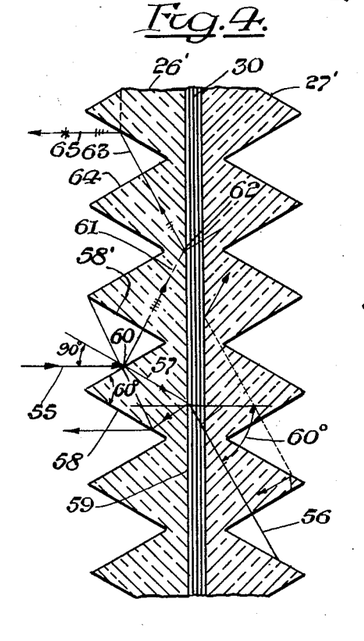
Figure 4 is a fragmentary vertical section somewhat enlarged of a second form of a reflux polarizer made in accordance with the present invention.

Referring to Fig. 4, there is shown a second form of prism which has the property of bending incident light 55. The incident ray 55 is first bent through an angle of 30° so that ray 57 is parallel to surface 58 of the prism, and emerges from the plane face of the prism 59 as ray 56, which makes an angle of 60° with the normal of the face 59. This bending provides the angle of incidence of 60° described in connection with Fig. 2.

A calculation shows that the index of refraction of the prism 26' or 27' to accomplish this result is the square root of 3, or, 1.732, when the prism apex angle is 60° as desired. This angle of 60° is quite important, since it produces the result that the ray which is reflected at the point of entrance 60 of the prism 26' results in a reflected beam 61, which is capable of entering the face 58' of the prism 26' without refraction, and which is internally reflected at the plane face 59 totally at point 62. The ray 61 after total internal reflection passes, as indicated at 63, through the face 64 of the prism and is, in part, reflected back into the system as ray 65.

Another portion of the ray 55 is refracted and undergoes further internal reflection before being sent back into the system as further ray 65. A careful study of Fig. 4 will reveal that the light energy is carefully conserved in the parallel beam, either transferred in the forward direction or returned back as ray 65 for further reflection, and further transmission on subsequent reflection through the parabolic focus. Only the 60° prism shown in Fig. 4 or Fig. 2 has these conservative properties. Other angles have a tendency to rapidly dissipate, by scattering, the light and thus preventing the attainment of a high efficiency. The prisms shown in Figs. 2 and 4, namely, the 60° prism, work best in conjunction with a high index multi-layer polarizer, having an index refraction as close to 1.732, as is practical.

The matter of conserving the reflected beams is of the utmost importance, since with high index materials, the reflected components may run between fifteen to twenty percent of incident light, and for the sake of efficiency, it is quite important that the reflected components be conserved and reutilized, instead of dissipating by scattering uselessly. In this connection, the use of antireflection film 54 is desirable, to minimize the refluxing action required.

The reflux polarizers of Figs. 2 and 3 may be utilized with large flat sources of light, such as diffused large area sources, or with spot beams for the purposes of non-glare illumination. As such they constitute articles of manufacture, quite useful apart from the combination with analyzers.

As a consequence of the low absorption factor of the multi-layer polarizers, they may be utilized with intense beams of light without danger to the polarizing medium, which may be constructed of plastic.

Where plastic is used for the construction of this polarizer, it may be made more readily in accordance with Fig. 2 since the index of refraction of the prism structure and combination shown in Fig. 2 is adaptable to the use of relatively low index of refraction materials. An index refraction of 1.50 is characteristic of many of the transparent plastic substances available today, as for example, methyl or butyl poly methacrylates.

The prism apex angle is set at 60° and the internal reflection shown is to produce an angle of incidence of 60°. The innerlayer multipolarizing members 30 are preferably of the high index type, and have an index of refraction of between 1.60 and 1.75, as hereinbefore described, with the preferred index of refraction being $1.732 = \sqrt{3}$.

In the case of the prism-multi-layer polarizer shown in connection with Figs. 2 and 4, the number of prisms per inch may vary according to the use for the devices shown. For satisfactory polarized headlights, the number of prisms may vary from four to twenty.

Figure 5:
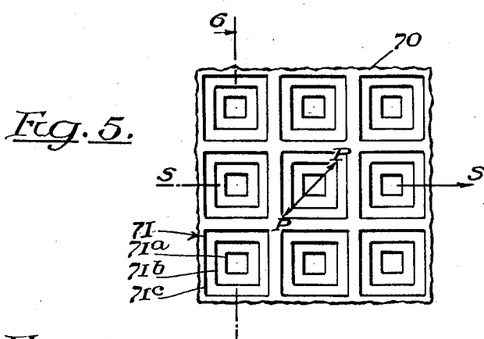
Figure 5 is a front elevational view, somewhat enlarged, of a second embodiment of the depolarizer.
Figure 6:
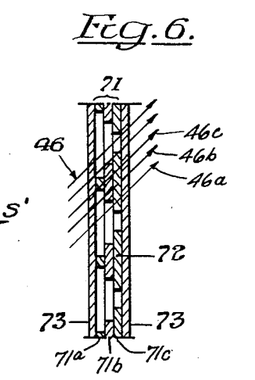
Figure 6 is a vertical section taken on line 6—6 in Figure 5.
Figure 7:
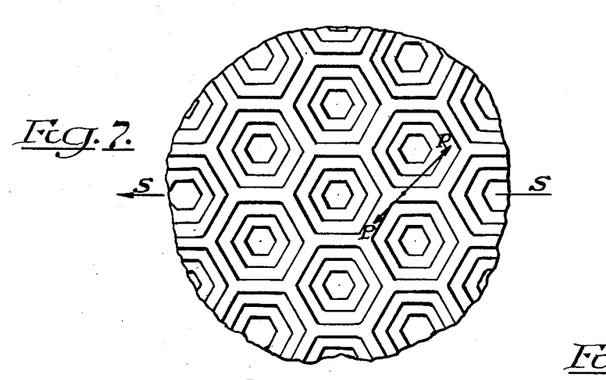
Figure 7 is a fragmentary view in elevation, somewhat enlarged, of a third embodiment of the depolarizer.

In Figs. 5, 6 and 7 there are shown additional forms of depolarizers, which may be used for the purpose of producing depolarized or unpolarized light from incident polarized light. The depolarizer 70 of this invention is constructed from a plurality of layers 71a, 71b, 71c, having repetitious patterns 72 cut out of them, said patterns having a definite area. The patterns form similar figures, such as the hexagon shown in Fig. 7, or the squares shown in Fig. 5. Successive layers have patterns which are arranged symmetrically about the smallest pattern and the cut-outs of the successive layers are such that the areas included between the successive patterns are all equal to the smallest area included within.

Analysis of the requirements of this form of depolarizer for the production of areas of equal included areas shows that the diameters of the similar patterns, regardless of which pattern may be chosen, as in Fig. 5 or Fig. 6, must follow the following laws:

$$D_N = \sqrt{N} D_1$$

Where $D_N$ equals the diameter of the $n$th pattern, where $N$ equals 1,2,3,4, ... N, and where $D_1$ is a dimension across the inside pattern.

The operation of the depolarizer shown in Figs. 5, 6, 7, is best shown by referring to Fig. 6, and more particularly the incident ray 46 passing through the depolarizing layers at the angle shown in Fig. 2. Beam 46 contains rays 46a which passes through only one layer of the pattern; beam 46b which passes through two layers of the pattern; and beam 46c which passes through three layers of the pattern.

The layers 71a, 71b, 71c, etc., are formed from a plastic sheet which has been extended or stretched so as to partially or completely line up the molecules contained therein; thus causing the sheet to become birefringent; that is, having the properties of imparting a retardation to polarized light along one axis to a greater extent than polarized light along the other axis. By defining the axis of birefringence in the direction of stretch SS', and the direction of the plane of polarization as PP' shown in Figs. 5 and 7, at 45° to the birefringent axis SS', the component of polarized light parallel to SS', will be retarded to a different extent, to that component of the polarized light normal to SS'. Moreover, since the rays 46a, 46b, 46c travel through different thicknesses; namely, one, two or three layers of the birefringent material 71, these rays will present different relative retardations to the components of polarized light parallel or perpendicular to the birefringent axis SS'. The total flux through the entire area of the depolarizer 71, will also be divided into equal portions, and said equal portions will travel through equal areas having successively greater retardations, the differences between which are equal. The net result of the plurality of successively greater retardations over the entire area will be to provide a randomizing or a disorientation of the plane of polarization of the light. Since the rays of light are not perfectly parallel and since the areas shown on the depolarizer are many and small, of the order of one-eighth to one-half inch in size, the result will be that the total light passing through the depolarizer will be completely disoriented. Thus light leaving the depolarizer 71 will exhibit the properties of unpolarized light; that is, when viewed with an analyzer, it will not show a change in intensity, as the analyzer is rotated.

The layers 71a, 71b, 71c, etc. may comprise a stretched sheet of cellophane, vinyl chloride, vinyl butyral; cellulose acetate, ethyl cellulose, and other similar materials, which are transparent, and which have a thickness of the order of from one to three-thousands of an inch. The degree of stretch may vary from slight to a maximum extent, depending on the degree of birefringence required. Ordinarily, the equal included areas are formed in overlaid patterns.

Referring to Fig. 6, the plurality of layers 71a, 71b, 71c, etc., together with a covering sheet 73 on both sides may be composited by heat and pressure so as to form a unitary structure, which is capable of being die-cut to the desired size, and assembled in one piece into a unit.

Figure 8:
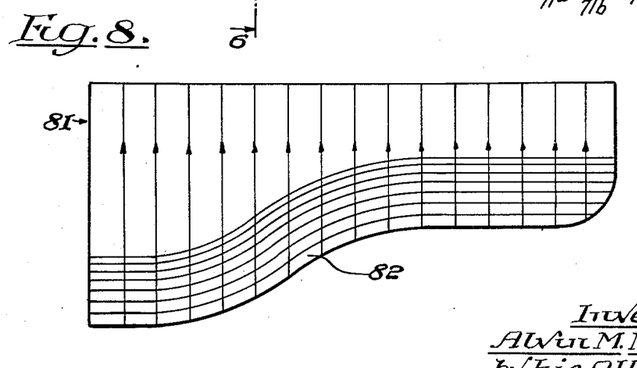
Figure 8 is a front elevational view of a polarizing visor made in accordance with the present invention.
Figures 9, 10:
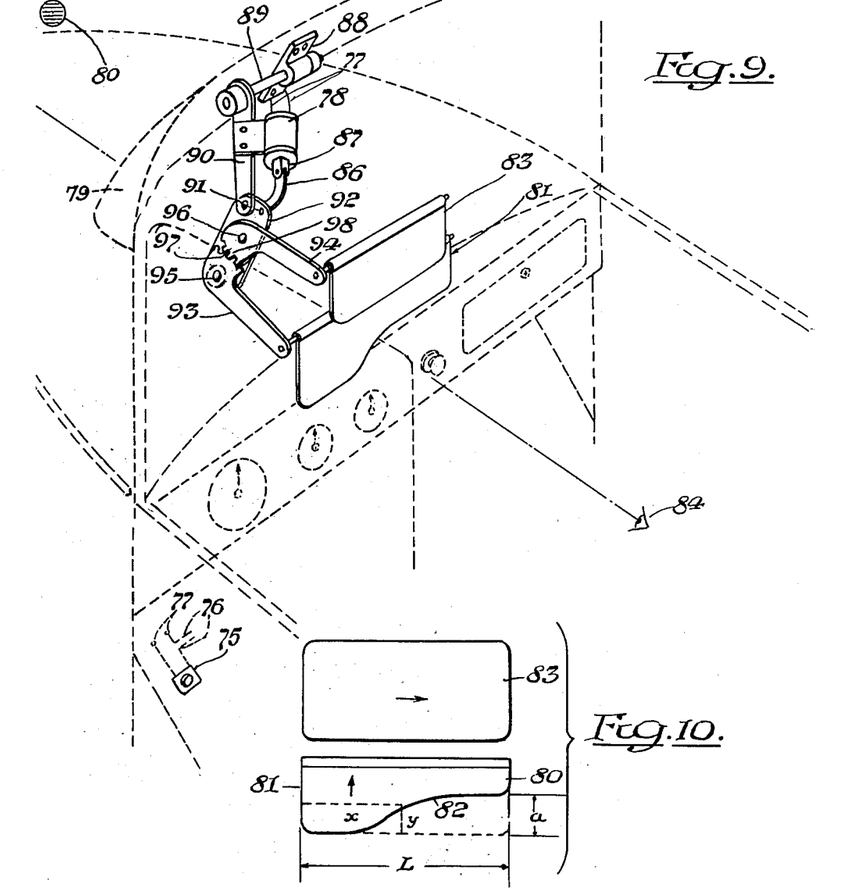
Figure 9 is a view in perspective showing a complete polarized visor and visor mechanism made in accordance with the present concept.
Figure 10 is a view in front elevation showing the visor assembly in position for night driving.

Referring to Figs. 8, 9, 10, there is shown in Fig. 9, a complete system installed within a car having a windshield 79, and showing the effect, in perspective, of approaching headlights 80 and objects in the field of view.

Figure 11:
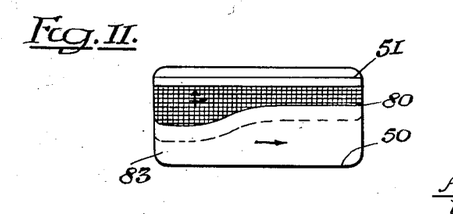
Figure 11 is a front elevational view showing the visor in position for daytime driving when being used as a non-glare shield for direct and reflected lighting.

In the night visor 81, see Figs. 8, 10, 11, the lower edge is cut away at 82 in the statistical approach pattern of the headlights on oncoming vehicles. The statistical approach pattern has been found to have approximately the following formula for the curve 82 at the bottom edge of the night visor 81:

$$y = a \sin \frac{x}{L} \frac{\pi}{2} \quad (1)$$

Where $x$ = variable distance along bottom of visor edge
$y$ = height of curve 80 in inches at distance $x$ in inches
$L$ = total length of visor
$a$ = maximum height of curve 80

For example:
$a = 1$ inch
$L = 10$ inches
Then, $$y = 1 . \sin \frac{x}{10} \frac{\pi}{2} \quad (2)$$

The plane of polarization of the night visor 81 might have been selected as horizontal, were it not for the fact that there is a particular advantage to the choice of the use of a horizontal plane of polarization for the headlight 80 and a vertical plane of polarization for the night visor 81. The reason for the choice is not dictated from the standpoint of the operation of the system. For the mere purpose of blacking out approaching headlights 80, any angle of the plane of polarization is suitable, so long as the plane of polarization of 80 and 81 are mutually at right angles. However, when driving under foggy conditions, the scatter of the light in the direction of the observer's eye 84 from the headlight beam 80 is minimized if the plane of polarization of the beam 80 is horizontal.

For daytime driving, the day polarized visor 83 is preferred, since it has the plane of polarization necessarily at the horizontal plane of polarization, in order to eliminate the polarized glare from the reflection of the road, which is predominantly vertically polarized.

By combining visors 81 and 83 which are polarized at right angles to each other, for the specific task of day and night there has been obtained an unusual and satisfactory result in this combination, which is shown in Fig. 11, and which is useful under certain conditions of operation, under which one may be driving into the sun, and it is desired to black out of the direct rays of the sun, while at the same time affording a view of the road ahead, and particularly downward toward the right.

It is shown that where visors 81 and 83 overlap, by the shading in Fig. 11, that a blackout portion is produced, while leaving the lower portion of the visor 83 in a horizontally polarized condition, capable of eliminating the reflected polarized light from the road, and at the same time eliminating the direct glare from the sun by blacking it out.

The visor arrangements shown in connection with Figs. 9, 10, 11, are especially suitable for all conditions of driving, i.e. day, night, foggy and sun glare.

Fig. 9 also illustrates a mechanism whereby the light of the oncoming car may be used to drop the visor 81 from the raised position shown in dashed lines during which a full overall unobstructed view of the road is obtained, to a position which is useful for intercepting the beams from the headlights 80.

This action may be accomplished in the known manner by means of a photo-electric cell system which is commonly employed to lower the beam of the headlights of a car from action of approaching headlights, and to raise the said beam from one's headlight when the approaching car has passed.

For ordinary night conditions, there is no purpose served by having the visor 81 in place, until the headlights of approaching cars cause the glaring conditions above referred to.

Driver control of the visor in Fig. 9 may be provided by a foot switch 75 connected to the car battery by leads 76 and 77 to electromagnet 78 for the purpose of effecting the raising or lowering of the night visor 81 through link 86 connected to the armature 87 of the magnet 78, in accordance with the needs of the operator.

The weight of each visor 81, 83 is balanced against the other and by reason of said balance may readily move upward or downward, as the operator desires, or adjusted, if necessary, to different heights, according to the height of the observer's eye 84.

The visor mounting consists of a ceiling bracket 88 having an axle 89 upon which is carried the primary arm 90. The arm 90 is capable of being pivoted on the axle 89 by the slight application of adjusting force by the observer. Mounted upon the primary arm 90 at the swingable end thereof, and held by a pivot axis 91, is a secondary arm 92. The secondary arm's motion and location are controlled by the electromagnetic link 86, and the electromagnet 78 electrically operated, as previously described.

The levers 93, 94 which support visors 81 and 83 respectively, are supported upon pivots 95, 96 respectively, which are mounted upon the secondary arm 92. The levers 93, 94 have formed into them at their extreme end and disposed about the pivot axis 95, 96, gear teeth 97, 98 which mesh so that when visor 83 is moved down, visor 81 moves in an upward direction. In this way, the movement of both arms is adjustable, and they balance each other. By the application of a small amount of friction, the arms and visors 81, 83 may be caused to remain in any position in which they are placed.

The visor 81 which has been previously called the night visor, in addition to being made of a linear polarizer having a vertically disposed axis of polarization, is also formed so as to provide a decreasing amount of polarization from top to bottom thereof, as shown in Fig. 8. The visor 81 thus transmits more light at the bottom thereof than at the top for the purpose of providing the maximum amount of anti-glare protection for the viewer, while giving him the greatest amount of road visibility.

It will be seen that as a distant car approaches, its headlights will first be seen through the lower part of the visor 81, at which time the intervening space between the viewer and the oncoming vehicle reduces the intensity of the light coming from the headlights of said vehicle. As the approaching car draws nearer and the amount of illumination impinging upon the eye of the observer increases, the path of said headlights will be in the direction of the top of the visor; that is, it will be seen through the upper portion of the visor, which visor is constructed so as to match the increase in intensity with an increase in polarization.

Additionally, the person looking through the visor 81 by reason of the fact that the lower portion thereof has a reduced amount of opacity, will be able to see the road in front of his car and particularly to the right of his car with the visor in place. It will thus be seen that a balance has been arrived at which will give the driver the maximum amount of safety in being able to see the road ahead of him while at the same time protecting him from the glare of oncoming headlights. The graduated density visor may also be useful in daytime driving in that it can be adjusted so that the upper portion thereof will serve to reduce sky and sun light, whereas the lower portion thereof will afford satisfactory visibility of the road for driving purposes. However, the day visor previously referred to will be found most efficient for the purposes of eliminating road glare and is preferably used in conjunction with the night visor 81.

Figure 12:
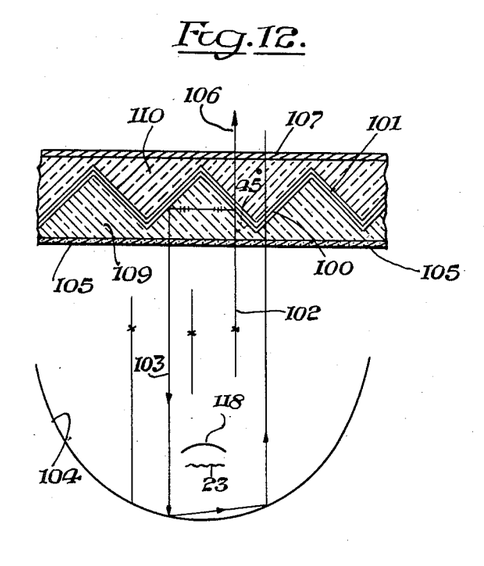
Figure 12 is a somewhat diagrammatic view of another form of reflux polarizing system, with certain portions omitted for the sake of clarity, in accordance with the present invention.

Referring now to Fig. 12, there is shown an alternative form of reflux polarizer system, which eliminates the need for the prism plates as previously shown and described.

In Fig. 12 the multiple layer polarizer 101 is arranged at 90 degrees. This enables the parallel rays such as 102 to be reflected twice and returned in a parallel but opposite direction as rays 103. Interposed between the parabolic reflector 104 and the multiple layer polarizing strip 100 and 101 is the depolarizer 105, such as described previously. This multi-layer polarizer is preferably of low index 1.30–1.50 and of at least twenty layers.

This system will produce only partially polarized light since the polarizing strips 100 and 101 do not make the necessary angle of about 33 degrees to the light beam but make an angle of 45 degrees. The 45 degree angle is necessary in order that the beam 103 be returned parallel but opposite to beam 102.

For the reason that the transmitted beam 106 is only partially polarized, a linear polarizer 107 is used to complete the polarization.

The efficiency of light through the linear polarizer 107 to polarized light is about eighty percent and since the system produces about eighty percent polarized light with an eighty percent efficiency without the linear polarizer 107, the entire system will produce better than ninety-nine percent polarized light with an overall efficiency of about sixty-four percent. The linear polarizer alone has a light transmission efficiency of only forty percent, thus absorbing a great deal of the light energy; that is, sixty percent, which is converted to heat. If the light beam is very intense, the linear polarizer may be destroyed because the absorption of heat increases the temperature beyond safety.

This system, however, reduces the absorption of light within the linear polarizer to about twenty-five to thirty percent, as compared to over sixty percent. Thus, a beam of double intensity can be used without danger of destroying the linear polarizer. Moreover, the overall efficiency of the system is over fifty percent more than that of the linear polarizer alone.

This fact is of a great importance in the utilization of this system for headlights, spot beam lights, search lights and the like.

The polarization of one component and the refluxing of another component of a parallel incident beam upon the polarizing structure is preferably achieved by the use of a plurality of high index of refraction layers.

Figures 13, 17, 19, 20, 22, 23, 24:
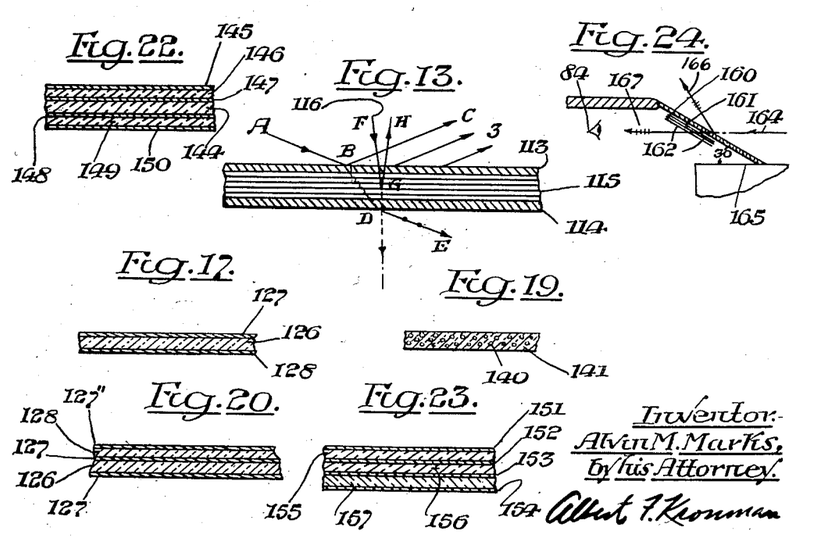
Figure 13 is a fragmentary cross sectional view of a multi-layer polarizer showing the various paths made by light incident thereon.
Figure 17 is a fragmentary view somewhat enlarged of a high index light polarizing medium.
Figure 19 is a fragmentary view somewhat enlarged of a further form of light depolarizer made in accordance with the present invention.
Figure 20 is a fragmentary view somewhat enlarged of a modification of the light polarizing system shown in Figure 17.
Figure 22 is a fragmentary view somewhat enlarged of a high index polarizer made in accordance with the present invention.
Figure 23 is a fragmentary view somewhat enlarged of a further high index polarizer made in accordance with the present invention.
Figure 24 is a sectional view showing multi-layer, high index films with alternate low index films, deposited on the inner face of an inclined windshield, for use as an analyzer.

In Fig. 13 there is shown a structure consisting of face plates 113 and 114, containing therebetween a plurality of layers 115 of high index of refraction. Rays 116 incident normally upon such a structure will be reflected and transmitted. However, by providing a sufficient number of layers, the transmission may be reduced to ten percent, five percent or one percent, depending on the number of layers, and the index of refraction of the said layers relative to the air spaces between. If the incident ray A—B makes an angle of incidence equal to Brewster's angle, which is given by the following formula $$\alpha = \text{Tan}^{-1} n$$

where N is the index of refraction and where alpha is Brewster's angle of incidence, then the transmitted ray D—E will constitute almost fifty percent of the incident ray A—B, regardless of how many layers 115 are interposed between; provided, however, that these layers are sufficiently thin and have little or no absorptive qualities in the total thickness presented. This is actually the case for most transparent materials, such as glass and transparent plastics.

Recapitulating, ray F—G can be practically totally reflected as ray G—H, while ray A—B is transmitted to the extent of about fifty percent as ray D—E without absorption at Brewster's angle. The other fifty percent of ray A—B is reflected as ray B—C, which is polarized in the plane of the paper, whilst the transmitted ray D—E is polarized in the plane normal to the plane of the paper.

Figure 14:
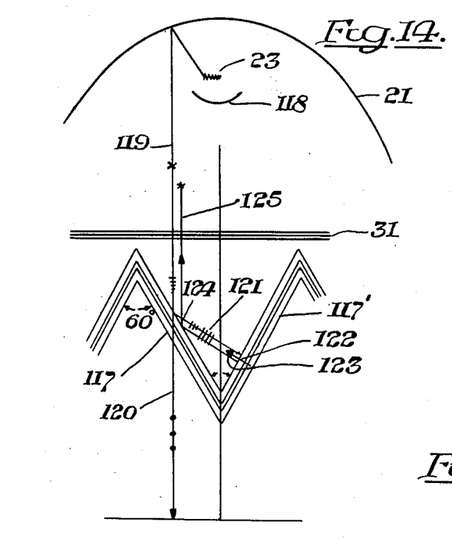
Figure 14 is a somewhat diagrammatic view of a further embodiment of a reflux type polarizing headlamp.

Referring to Fig. 14, there is shown a plurality of structures, such as the layer combination 113, 114, 115 shown in Fig. 13 and denoted by 117, forming an angle of 60 degrees therebetween, and shown as a component of a system comprising a source of light 23, a spherical reflector 118 and a parabolic reflector 21, and a depolarizer 31. This system produces a parallel beam of light which is incident upon the plurality of plates 117 at an angle of 30 degrees to the faces thereof. The apex angle between the layers 117 is 60 degrees. A remarkable coaction thereupon takes place. The incident parallel beam 119 is partly transmitted as polarized beam 120, polarized vertically in the amount of approximately fifty percent of the input beam 119. The remainder of approximately fifty percent is reflected from the surface of the layer 117 at 30 degrees and is incident as ray 121 at an angle of 90 degrees to the layers 117', at 122. The ray 123 is reflected at 122 and reaches the opposite layer 117 again at an angle of incidence of 30°. Since the layer 117' reflects practically all the light incident upon it at this normal angle, in accordance with the description given in connection with Figure 13, the ray 121 thereupon is reversed in direction with little loss by transmission, and travels backward along the same path as ray 123. Since the rays 121 and 123 are polarized horizontally, the ray 123 is totally reflected again at the point 124 and returns parallel to the incident beam as beam 125, being depolarized by passage through 31.

The rays, such as 125, form a parallel beam, returning into the reflecting parabola 21, whereupon they again pass into the focal point, or source of light 23, and are reflected again from the spherical mirror 118 and the parabolic reflector 21. The cycle is then repeated, thus setting up a reflux action, which eventually results in approximately seventy-five to eighty-five percent of the light available being refluxed through and appearing as vertically polarized light in a parallel beam, such as 120. In order to enable this to occur, the ray 125 must be depolarized by the interposition of a depolarizer, such as 31, as has been previously described.

In order to effect the efficient polarization and transmission of light in this manner, the Brewster's angle in Figure 14 must be 30°. Therefore, in accordance with equation $\alpha = \tan^{-1} N$, the index of refraction of the layers 117 must be at 1.732.

Figure 15:
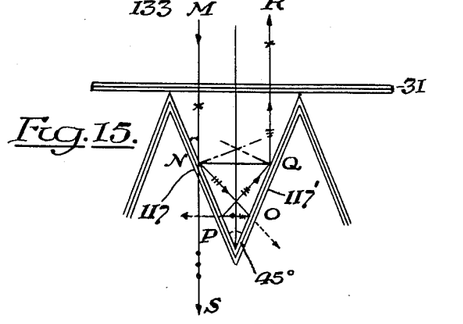
Figure 15 is a somewhat diagrammatic view of a light polarizing medium employing a forty-five degree included angle between the polarizing layers.

Referring to Figure 15, there is shown a second modification of the system shown in Figure 14, but based upon similar principles which need not be reiterated. In Figure 14 three reflections are required to return the ray 119 back along itself as ray 125.

In Fig. 15 the angle between the layers 117, 117' is adjusted as 45° and the ray must make four reflections to return parallel to itself. Thus, the paths of the rays are as follows:

Transmitted ray M—N—S
Reflected ray M—N—O—P—Q—R
Ray Q—R parallel but opposite to incident ray M—N Again, the ray N—O is polarized horizontally and is practically totally reflected at points O—P and Q because of the horizontal polarization, and returned as ray Q—R through the depolarizer 31, as depolarized ray Q—R. In this figure the Brewster's angle is again critical at 22.5, for which the layers must have an index of refraction equal to 2.414.

Figure 16:
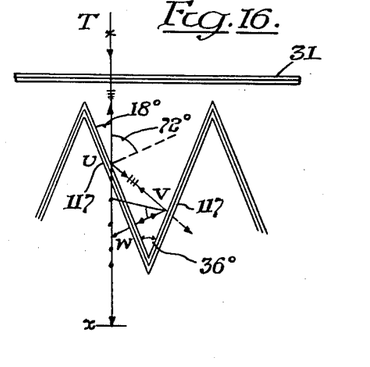
Figure 16 is a somewhat diagrammatic view of a further modification of the principles illustrated by Figures 14 and 15 but employing an included angle of thirty-six degrees between the multiple layer polarizer.

In Fig. 16 there is shown a still further modification of the principles described in connection with the Figs. 13, 14 and 15. In this case the layers 117, 117' make an angle of 36° and require five reflections to return to the source parallel to itself. The incident ray is T—U, which is transmitted as the vertically polarized ray U—X. The reflected ray U—V is polarized horizontally and is reflected as follows: At points U—V—W, returning along itself back to V—U, and returning parallel to T—U, but in an opposite direction as ray U—T. Again, ray U—T is initially polarized horizontally and is depolarized by depolarizer 31.

In Fig. 16 the Brewster's angle is 18° and the critical index of refraction is 3.077.

Materials which may be used with the above figures to attain the desired index of refraction, are as follows:

(Titanium dioxide _____________________ Index 2.4)
(Zinc sulphide _______________________ Index 2.4)
(Stannic oxide _______________________ Index 1.8)
(Selenium ___________________________ Index 3.0)

In Fig. 17 there is shown a thin central transparent member 126, such as sheet plastic, cellulose acetate, polyester film or extremely thin glass ribbon. The surfaces 127, 128 of the thin member 126 are coated with a film of approximately .0001" to .0005" thick of one of the materials set forth above.

The choice of materials in connection with Fig. 14 may be stannic oxide, in connection with Fig. 15 either titanium dioxide or zinc sulphide, and in connection with Fig. 16, selenium.

The methods of applying such materials are known in the prior art, and particularly reference is made to Patent #2,478,385, issued to R. A. Gaiser.

Figure 18:
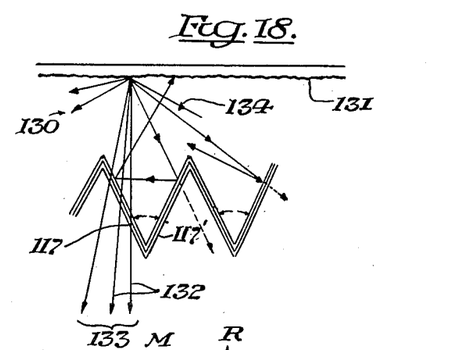
Figure 18 is a somewhat diagrammatic view of a reflux light polarizing system for use in conjunction with general illumination and other electromagnetic radiations.

In Fig. 18 there is shown an application of the polarizers hereinbefore described utilized in connection with a plurality of lights 130, a diffusing background reflector 131, such as a surface coated with magnesium oxide paint, and the plurality of layers 117, constructed in accordance with Figs. 14, 15 or 16. The depolarizer 31 in this case need not be used, since the diffusing white surface 131 performs this function. The rays 133 which emerge from the polarizers 117, in accordance with this invention, are gated into an approximately parallel but somewhat divergent beam 133. Other light, such as rays 134, which are emitted by the diffusing surface 131, strike the surfaces 117 at angles other than Brewster's angle or near thereto, and are thereby almost totally deflected back to the diffusing surface 130, whereupon the cycle is commenced over again. In this way a remarkable effect occurs, whereby the diffused surface co-operates with a plurality of layer polarizers to produce an almost parallel beam 132, which is slightly divergent and highly polarized; as well as a high proportion of the initial light from 130 being utilized and channeled into this almost parallel beam 132.

The phenomena disclosed in connection with Figure 18 will occur with other electromagnetic radiations, such as microwaves if equivalent structures are utilized. Thus, instead of employing a source of visible light, a suitable known microwave radiator and a depolarizing reflector 131 may be used, in front of which there is disposed a layer polarizer, whereupon a highly satisfactory polarized and directed beam of microwaves will be formed.

Referring again to Fig. 17, in which two layers of high index of refraction material were shown coated upon the two surfaces of the member 126, for the purpose of forming a polarizer, it is within the purview of the present invention to form a structure employing three or more such layers for this purpose. (See Fig. 20). It has been found, for example, that three layers of titanium dioxide index 2.4, when used in spaced parallel relationship to form a multi-layer polarizer, provide highly satisfactory results employing a structure comprising a few layers. The layers of titanium dioxide 127, 127', 127", in Fig. 20 may be separated, for example, by suitable low index layers of transparent material such as glass sheets 126, 128, which preferably may have an index of refraction of 1.50 or less.

Another form of depolarizer within the contemplation of the present invention is shown in Fig. 19. This structure consists of a plurality of small glass balls 140 which have been heated and suddenly cooled to form optical stress patterns therein. These balls 140 may be of the order of one-tenth to one millimeter in diameter and in sufficient number in concentration per unit area to intercept all of the light traveling through the depolarizer. Due to the variety of path lengths and differing strains in the path lengths, randomization of the elliptical polarization will be produced, thus effectively depolarizing the light entering the structure. The glass balls 140 must be suspended in a medium such as a plastic 141, which medium has the same index of refraction as the balls. The manner in which the glass balls may be suspended within the plastic medium is well known in the art.

Figure 21:
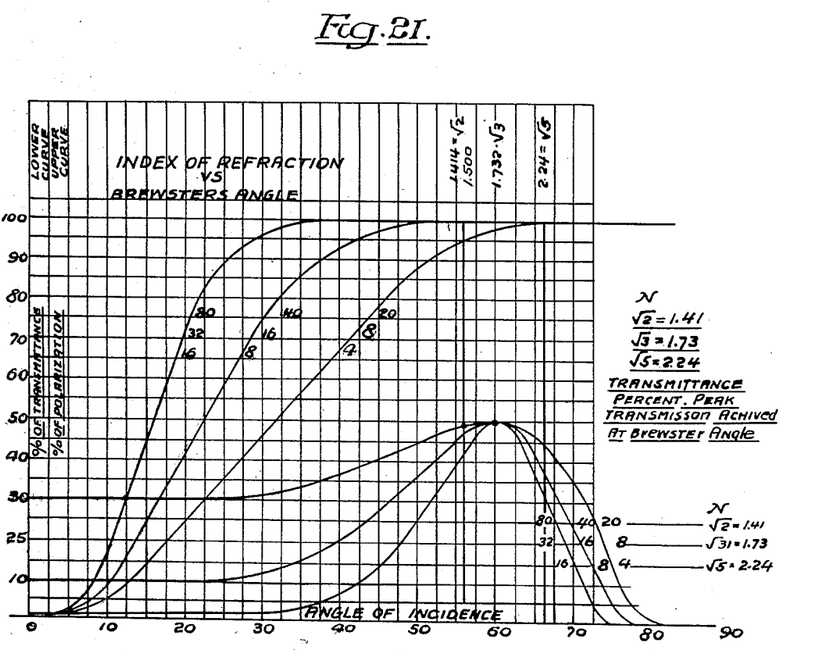
Figure 21 is a representation in the form of a graph showing the percentage of polarization and the percentage transmission plotted against the angle of incidence for materials of various indices of refraction, and corresponding number of layers.

In Fig. 21 there is shown the percentage transmittance and the percentage polarization plotted against the angle of incidence, computed for L layers and various indices of refraction, N.

Fig. 20 serves to illustrate the unexpected reduction of the transmittance to nearly zero at angles of incidence of zero to 35° with a sufficient number of layers at indices of refraction 1.41 (eighty layers), 1.73 (thirty-two layers) and 2.24 (sixteen layers).

The peak transmission occurs at Brewster's angle. Thus, the peak transmission for an index of refraction of 1.732 occurs at a 60° angle of incidence. Another unforeseen result shown by Fig. 21, is that the percentage polarization of transmitted light increases as the Brewster's angle is exceeded, while it might have been thought to be a maximum at this angle.

A further result, apparent from Fig. 21, is that a lesser index of refraction can be used with a higher percentage polarization with more layers, but at the loss of some transmission.

The curves are calculated for $N = 1.732$ and various numbers of layers, as indicated, but other indices may be used with a resultant shifting of the peak transmission and the percentage of polarization curves to Brewster's angle.

It has been found that, with a sufficient number of layers, substantially all of the transmitted light is highly polarized at a moderately large angle of incidence. Another result is that, say 15 layers, of a relatively low index of refraction (1.50), may be used with a 60° prism, 4° past the Brewster's angle (56° for $N=1.50$), with improved percentage polarization from ninety-eight percent at Brewster's angle (56°) to, say, ninety-nine percent at 60°. The peak transmission is reduced by only about 2%. Alternately, only eight layers of index $N=1.732$ may be used with ninety-eight percent polarization at 60°; or, only four layers of material $N=1.732$ may be used with ninety-five percent polarization at 60°.

Low index (1.50) materials are more readily obtainable for the manufacture of the prisms; hence, it is desirable to use total reflecting 60° prisms, with for example, fifteen layers of $N=1.50$; ten layers of $N=1.732$, or, six layers of $N=2.24$, between inwardly facing prisms.

In Figs. 22 and 23 there are shown certain novel polarizing structures which employ high index coating, such as a titanium dioxide, which has an index of 2.4 relative to air.

Referring now to Fig. 22, there is shown a glass plate 144 having deposited on the outer surfaces a number of layers, such as 145, 146 and 147. Layers 145 and 147 comprise high index coating such as titanium dioxide, whilst the thin layers 146 between are of low index, comprising, for example, a thin silica film or a magnesium fluoride film. In like manner, the other face of the glass plate 144 also contains high index film 148 and 150, with a low index film 149 interspersed between. The composite shown in Fig. 22 is capable of polarizing light to a high degree, at angles of incidence in the vicinity of 60°.

By forming a structure (not shown) similar to Fig. 22 comprising three layers having high indices of refraction, and two layers between having low indices of refraction, on each face thereof, making a total number of six layers of high index of refraction, approximately ninety-eight percent of the light may be polarized in the vicinity of approximately 60° angle of incidence.

Calculation shows that the relative index of refraction between the layers 145 and 146, for example, where the indices of refraction of the individual film relative to air are 2.4 and 1.3 respectively, is 1.85. In a similar manner, the indices of refraction of the high index film 147 relative to glass 144 of index of refraction 1.5, is 1.6. It will be noted that these indices of refraction are relatively high, and correspond roughly to those ordinarily obtainable for films of the usual low index materials relative to air.

In Fig. 23 there is shown a composited structure comprising high index films such as titanium dioxide 151, 152, 153 and 154 which have been formed upon thin sheets of micro or ribbon glass 155, 156 and 157. These sheets are then laid together in the absence of air and pressed while heated and softened together to form a fused composite or unitary layer.

Sheets such as Figs. 22 and 23 are unitary in structure, and can be handled as a single piece. They can be made in large sheets and cut just as a piece of ordinary glass is cut, by scoring with a scratch and flexing. The articles thus have the utility of ordinary pieces of glass, while at the same time having the property of polarizing light owing to their multi-layer nature.

It has been found that it is possible to obtain effective polarization with a minimum number of layers, by employing materials such that the relative index of refraction between surfaces is at least 1.5 and preferably of the order of two or more. The use of the titanium dioxide film disclosed herewith is particularly suitable in constructing the articles shown in Figs. 22 and 23. In Fig. 22, for example, where the interlayer 146 may be of an index or refraction 1.3, the relative index of refraction is 1.85. In Fig. 23, for example, where the interlayers 155, 156 and 157 may comprise glass of index on refraction 1.5, the relative index of refraction is 1.6 and a high degree of polarization may be obtained with approximately two to twelve titanium dioxide films with glass in between.

The structures shown in Figs. 22 and 23 have the further advantage that the coatings are thin, uniform, and remain flat by reason of the support upon flat glass surfaces. Structures comprising air interspaces have a tendency to depart from flatness and have a tendency to scatter and disperse light somewhat, thus making such materials translucent. The articles of the present manufacture (particularly structures such as Fig. 22) are on the contrary capable of transmitting optical images without distortion, an important attribute. Moreover, this attribute may be facilitated by the fact that films such as 145, 146 and 147 are extremely thin, and are such as not to give rise to multiple noticeably separated reflections which would cause multiple images.

In connection with the thickness of the film 145, 146 and 147, it has been found that a thickness of approximately one-quarter wave length of yellow light to normally incident light will facilitate normal reflection for the high index films such as 147, and one-quarter wave length of yellow light for the low index films such as 146, and, owing to the increased path length, tend to facilitate the transmission and reflection of polarized light at angles of incidence greater than normal.

While the polarizing layers 117, 117′, shown in Figs. 14, 16 and 18 are shown as unsupported for the sake of clarity, the structure indicated in Fig. 12 at 101 comprises a form which may be useful in connection with the reflux system previously described, and which obviates the need for prismatic constructions. Moreover, since the structure shown in Fig. 12 is unitary in nature, it may be handled with great ease and fabricated quite readily. In Fig. 12 the polarizer 101 may also be a composite such as shown in Fig. 23, comprising a plurality of titanium dioxide layers between which are layers of thin ribbon glass. The multi-layer composite polarizer 101 may also be supported at angles of approximately 60°, for example, between blocks of glass 109, 110; and outerspacing glass 107; and depolarizing layer 105, and the whole fused to form one solid unit as shown in Fig. 12.

Referring to Fig. 24, there is shown the application of the high index multi-layer polarizer to the use as an analyzer on car windshields or separate visors.

In order for this form of analyzer to be effective, the windshield or visor must be inclined at approximately 30°. The observer may change his position so that he may shift to bring his eye 84 to coincide with the lower edge of the analyzer, when necessary.

The advantage of the high index type of polarizing visor is its high stability under long exposure to sun and other atmospheric conditions. This visor is preferably in the form of a plurality of layers applied to the inner, upper left-hand portion of the windshield, on the inner face thereof. The windshield form of polarizer shown in Fig. 24 comprises high index titanium dioxide films 160 and 162, separated by a low index film 161, such as magnesium fluoride.

These layers form a high reflecting coating, which would tend to pick up reflection from forward areas under the windshield, and accordingly, there is interposed at the base of the windshield a black felt, or suitably absorbing dull mat finished surface 165, so as to minimize such surface reflection. Beam 164, which contains vertically polarized light from headlights, or from reflection from the surface of the road, is reflected away from the windshield at the high index coating, as rays 166. Non-glare, or vision containing light, is preferentially admitted, since this contains a high proportion of horizontally polarized light, as shown by the transmitted beam 167.

While only three layers are shown in the drawings, it will be understood that this structure may be repeated, so that five, seven, or more layers may be employed. A feature of these layers is that they are extremely thin, being of the order of a quarter wavelength thick, and as such do not interfere with the transmission of optical images. Reflecting surfaces separated by much greater thickness would have a tendency to introduce multiple images in the transmitted beam 167. However, the layers presently employed are of such adjusted thickness that the perfection of the transmitted optical image is not materially reduced, although a maximum reflectance is secured at Brewster's angle.

Figures 25, 26, 27, 28:
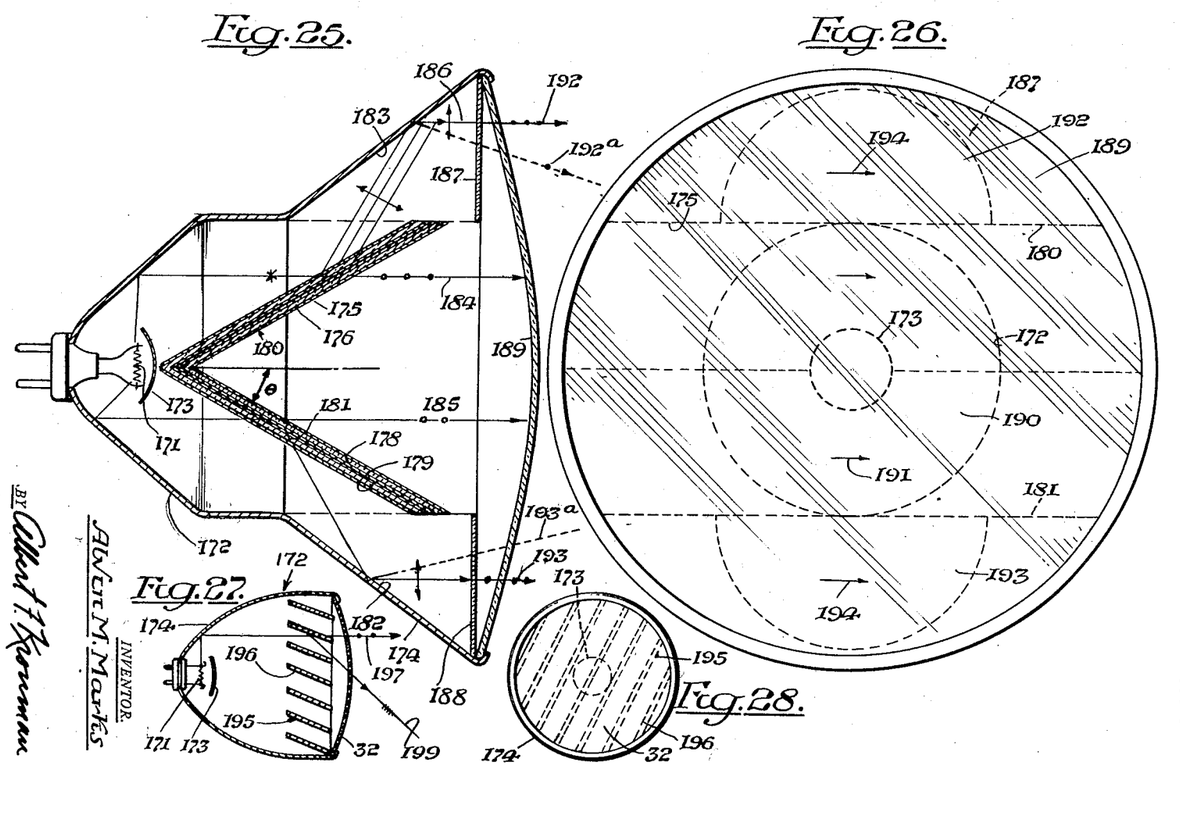
Figure 25 is a longitudinal sectional view of a second embodiment of a polarizing headlamp.
Figure 26 is a view in front elevation of the headlamp shown in Figure 25.
Figure 27 is a longitudinal sectional view of a third embodiment of a polarizing headlamp.
Figure 28 is a view in front elevation of the headlamp shown in Figure 27.

Referring now to Fig. 25, there is shown a filament source 171, a parabolic reflector 172, and a shielding spherical reflector 173. All the elements shown are mounted within a sealed envelope 174. The multi-layer polarizing elements are assembled in the form of a V-shaped beam splitter. The polarizing elements are preferably of the type herein disclosed comprising high index layers deposited upon one or more glass sheets 175, 176. Two such coated sheets of glass 175 and 176 are shown. Each surface of the sheets 175, 176 is coated, thereby providing a total of four one-quarter wave length layers of titanium dioxide for the multi-layer polarizer.

In a similar manner the lower part of the V comprises two sheets of transparent glass 178 and 179 having four layers of titanium dioxide one-quarter wave length films deposited upon the surfaces of the glass. The sheets 175, 176 and 178, 179 are disposed at angles to the parabola axis, which angles may be of the order 15° for titanium dioxide and up to 34° for glass only. In addition to the beam splitting multi-layer polarizing elements generally indicated as 180 and 181, there are metallic plane reflectors 182 and 183 for redirecting the polarized beams which are reflected from the elements 180 and 181. The reflectors 182 and 183 redirect the reflected component of polarized light parallel to the original axis of the parabola 172 or slightly convergent to meet at a distant point. Since the reflected components are polarized at right angles to the transmitted components of the light, 184 and 185, it is necessary to revolve the plane of polarization of the reflected components of light, such as 186, through 90° by the half wave retardation plates 187 and 188. The half wave retardation plates 187 and 188 may be constructed in the manner well known in the art, and may be composed of selected sheets of natural mica crystals, or may comprise stretched birefringement plastic sheets having their retardations adjusted in the well known manner. The forward part of the lamp 189 may comprise a glass sheet pressed to contain the prismatic light dispersing elements (not shown) usually employed for that purpose in standard headlights.

The output beam of the above described system has the shape shown in Figure 26 and comprises a central beam 190 which has been transmitted directly through the polarizing elements 180 and 181 and is polarized in the direction shown by the arrow 191.

In like manner the rays transmitted through the retardation plates 187 and 188 are rotated as to their plane of polarization through 90° so that the plane of polarization in the light beams 192 and 193, shown by arrows 194, are parallel to the plane of polarization 191 of the central beam 190.

In appearance the output beam will comprise a central beam 190 of circular section, and two additional beams 192 and 193 of semi-circular section, as shown in Figure 26. However, the dispersing prism 189 may redirect the beam in the conventional pattern.

It will be understood that in place of the two retardation plates 187 and 188, a single retardation plate may be used in front of the central beam 190, and all planes of polarization of the output will be at 90° to that shown. The plastic retardation plate(s) may be laminated between the outer face 189 and an outer glass sheet (not shown).

In the place of the two glass sheets 175 and 176, a single glass sheet may be employed with alternate layers of magnesium fluoride and titanium dioxide, all of approximately one-quarter wave length thickness on each face of the single glass sheet. For example, two layers of titanium dioxide with an interlayer of magnesium fluoride may be deposited on each face of the glass sheet to produce a highly efficient beam splitting polarizer.

The use of the symmetrical V-shaped beam splitting polarizer shown in Fig. 25, combined with the high index material for producing said polarized light, provides a structure which delivers a high proportion of transmitted light as compared to the light output from the parabolic reflector alone, as in the present unpolarized standard lamp.

It is within the purview of the present invention to incorporate the structures shown in Figs. 25 and 26 within the bulb of the presently known sealed beam light lamp. For this purpose the entire optical system, including the V-shaped beam splitting polarizer, would be reduced in size from the showing so that the entire assembly could be incorporated within the standard glass envelope.

In Fig. 25 the angle $\theta$ is shown at 30°, which corresponds to an index of refraction of 1.732 for peak transmission through the polarizing layers shown, as previously described. An angle of 34° may be used with six to eight thin glass sheets, making for a shorter optical system. However, using a single layer of glass coated with two one-quarter wave length titanium dioxide coatings (one on each surface), the following unexpected and highly satisfactory results have been achieved; the curve of transmission and the percentage of polarization are generally of the shape shown in Fig. 21 with the peak transmission occurring at approximately 15°. This information indicates an index of refraction of 2.7, with a measured polarizing ratio of 9 to 1 and a transmission of approximately 62%. The overall efficiency of the system is 62% without a reflector, but with the reflectors 182, 183 shown in Fig. 25, approximately 85% total efficiency has been achieved.

This simple single glass construction with titanium dioxide layers solves the practical problem imposed by multilayer polarizers which have heretofore been difficult to fashion because the layers have had to be thin and numerous, yet supported in an absolute plane in order to obtain accurate reflections so as to insure the parallelism of the reflected beam.

It will, of course, be apparent that the polarizers having additional layers such as in the modifications shown in Figs. 20, 22 and 23 may also be employed in lieu of the above-described structure to obtain greater polarizing ratios.

In another test made with two layers of glass covered on each side with one-quarter wave titanium dioxide coatings, a peak transmission was achieved with the angle $\theta$ at 20°, of 53½% and a polarizing ratio of 12 to 1. At an angle of 15°, transmission dropped to 50%, but the polarizing ratio increased to 17.7. The overall system efficiency was approximately 75%.

The beam splitting V-shaped polarizer shown in Fig. 25 may be constructed of two single plates of glass (one on each side of the V) coated on each side thereof with a single one-quarter wave layer of titanium dioxide having a thickness of one-quarter wave length. With this structure the plate should be disposed at an angle of 15° with respect to the longitudinal axis of the parabolic reflector. When so disposed, the beam splitting polarizer will transmit 62% of light as polarized light, giving a polarizing ratio of 9 to 1 and an overall efficiency of about 85%. This form has been found highly satisfactory and affords adequate protection from the glare of vehicle headlights, and requires only a slight increase in filament wattage to reach present illumination intensities.

The position of reflectors 182 and 183 may be altered adjustably, or fixed at a predetermined angle of beam convergence for the purpose of causing the beams reflected therefrom to converge to a distant point, as indicated in dashed lines 192a, 193a in Fig. 25. In this manner a focusing feature can be achieved, so as to direct the maximum light intensity at the distant point desired.

Another result stemming from the beam splitting structure hereinbefore described, is that the beam, being split and spread over twice the area of the ordinary source of illumination, reduces the glare from the light source, even to the naked eye of an observer who may not be looking through an analyzer. Thus, pedestrians unequipped with analyzers would not be as much dazzled by headlamps employing the beam splitting polarizer in accordance with the present construction.

The use of the heretofore known polarizing structures, which required substantially increased candle power, produces a greater glare effect to the unprotected eye of the observer, than presently known unpolarized structures.

Additionally, until such time as the majority of automobiles are equipped with analyzers, vehicles supplied with beam splitting polarizers will present less of a driving hazard to oncoming vehicles than those using conventional lighting equipment.

In lieu of the beam splitting V, shown in Fig. 25, a single inclined multi-layer polarizing structure and a single reflector and one-half wave retardation plate may be used, thus providing two output beams of the same diameter with the mirror adjusted to converge the reflected beam at a distant point. This system has the advantage of simplicity but is less compact. However, in most modern cars this optical system will readily fit beneath the fenders.

Referring now to Figs. 27 and 28, there is shown a third form of the polarized source of illumination consisting of the parabolic reflector 172, a filament source 171 and a shielding spherical reflector 173. A sealed envelope 174 encloses the light emitting elements and the polarizer generally indicated at 195. The polarizer 195 is formed of a series of plates 196 made of glass or some other transparent material, which plates are disposed in parallel spaced relationship to one another across the front of the illuminating device. The plates 196 are coated with a layer of titanium dioxide on at least one side thereof and are alined so as to lie at an angle of 15° to the longitudinal axis of the parabolic reflector 172. The front of the plates may be covered by a glass or beam spreading prism 32, in accordance with the previously described structure. In operation, this form of polarizing headlamp will transmit 62% of the light, as indicated by the beam 197. The structure will give a polarizing ratio of 9 to 1 but will require an increase in the wattage of the lighting system; as for example, those presently used on automobiles of from 45 to 75 watts.

The substantial improvement of this structure over those previously known can be seen from the fact that were a linear polarizer to be employed, the filament strength would have to be increased from 45 to 135 watts. The remaining 38% of the light coming from the filament 171 is deflected by the plates 196, as indicated by the ray 199. This ray 199, hereafter called the auxiliary beam, will not be polarized in the desired plane, but may be directed toward the side of the road and substantially out of the path of the approaching viewer.

By arranging the plates 196 as shown in Fig. 28 so as to form an angle of 15° with the vertical axis of the lamp, the auxiliary beam 199 may be directed at a point which will be suitable for illuminating the side of the road or the curb for driving purposes.

In lieu of the titanium dioxide coatings herein referred to, selenium or silicon coatings, having higher indices of refraction, may be employed with the result that the auxiliary beam 199 can be moved forward, making a smaller angle with the main beam 197 and the number of coatings may be reduced to one on each plate 196 instead of two.

Referring again to Figs. 25 and 26, it is within the contemplation of the present invention to employ a system of positive and negative cylindrical lenses (not shown) between the parabolic reflector 172 and the beam splitting polarizer, for the purpose of compressing the beam of light coming from the parabolic reflector. The nature of the beam emanating from the lenses is such that it assumes the shape of an ellipse, the small dimension of which is equal to one-half of the circle diameter of the original beam, and the large dimension of which remains that of the diameter of the beam.

After the compressed beam has traversed the polarizing system, consisting of the V-shaped polarizer, the plane reflectors 182, 183 and the retardation plates 187, 188, it will have been restored to its original circular shape, by reason of the beam splitting and spreading feature heretofore described. The circular shaped beam will then traverse the beam-spreading prism 189, in the usual manner, so as to conform to the shape of present-day headlamp structures.

Having thus fully described the invention, what is claimed as new and desired to be secured by Letters Patent of the United States, is:

1. The method of polarizing electro-magnetic radiations which consists of the steps of directing the radiations at a light polarizing medium, randomizing at a point spaced from the source of said radiations that portion of the radiations which are reflected from said polarizing medium to change it from polarized to unpolarized light and thereafter redirecting the said unpolarized light at the said polarizing medium.

2. The method of polarizing electro-magnetic radiations which consists of the steps of directing the radiations at a light polarizing medium, randomizing at a point spaced from the source of said radiations that portion of the radiations which are reflected from said polarizing medium to change it from polarized to unpolarized light gathering the randomized light and thereafter redirecting the said unpolarized light at the said polarizing medium.

3. A device for producing plane polarized illumination comprising, a source of light, a light reflecting member behind the light source, a multi-layered light polarizing member in front of the light source to receive the light coming from the reflector, and a randomizing birefringent sheet between the reflector and polarizing member for depolarizing that portion of the light which is reflected from the polarizing member before it again reaches the light reflecting member.

4. A device for producing plane polarized illumination comprising, a source of light, a light reflecting member behind the light source, a small spherical reflector immediately in front of the light source, a multi-layered light polarizing member having light directing prism plates on each side thereof in front of the light source and the spherical reflector to receive the light coming from the reflector and a randomizing birefringent sheet between the reflector and polarizing member for depolarizing that portion of the light which is reflected from the polarizing member before it again reaches the light reflecting member.

5. A device for producing plane polarizing illumination comprising, a source of light, a light reflecting member behind the light source, a small spherical reflector immediately in front of the light source, a multi-layered light polarizing member comprising a series of angularly disposed panels having an included angle of 60° therebetween so as to form a plurality of prism defining surfaces adapted to receive the light therethrough at an optimum angle in front of the light source and spherical reflector to receive the light coming from the reflector, and a randomizing birefringent sheet between the reflector and polarizing member for depolarizing that portion of the light which is reflected from the polarizing member before it again reaches the light reflecting member.

6. A device for producing plane polarizing illumination comprising, a source of light, a light reflecting member behind the light source, a multi-layered polarizing member comprising a first cover plate, a plurality of very thin glass flakes disposed thereon in overlapping relationship to each other and a second cover plate overlying the said flakes in front of the light source to receive the light coming from the reflector, and a randomizing birefringent sheet between the reflector and polarizing member for depolarizing that portion of the light which is reflected from the polirizing member before it again reaches the light reflecting member.

7. A device for producing plane polarized illumination comprising, a source of light, a light reflecting member behind the light source, a small spherical reflector immediately in front of the light source, a multi-layered light polarizing member consisting of a plurality of transparent sheets formed from material having a low index of refraction of the order of at least 1.30 and not exceeding 1.50 and comprising at least twenty layers of said material, light directing prism plates on each side of said polarizer, the angular surfaces of said plates defining a sinuous path therebetween for the multi-layered polarizer, said prisms having an included angle of 90° in front of the light source and spherical reflector to receive the light coming from the reflector, a linear light polarizing sheet disposed in front of the outer prism, and a randomizing birefringent sheet between the reflector and polarizing member for depolarizing that portion of the light which is reflected from the polarizing member before it again reaches the light reflecting member.

8. A device for producing plane polarized illumination comprising, a source of light, a light deflecting member behind the light source, a light polarizing member in front of the light source to receive the light beam coming from the reflector and redirect the reflected component back parallel to the beam axis, and light transmissive means, consisting of an isotropic plastic sheet having a plurality of randomly oriented crystallin particles therein, said particles being both transparent and birefringent, in front of the reflector for depolarizing that portion of the light which is reflected from the polarizing member before it leaves the light reflecting member.

9. A light polarizing member comprising a multi-layered light transparent polarizer formed of sheets of titanium dioxide in the form of a plurality of panels adjacent portions of which are disposed at a 45° angle and a prism adapted to cause light falling thereon to impinge upon the multi-layered member at an angle which will approach the Brewster's angle of 22.5° for the said multilayered member.

10. An article of manufacture for use in connection with a head light, said head light having a parabolic reflector, a light emitting element located in front of the reflector, a small spherical reflector in front of the light emitting element, and a flat front cover glass overlying the open front of the reflector, comprising an internally reflecting inner prism plate, a light depolarizing member in front of the inner prism plate, a multi-layered light polarizer in front of the depolarizer, and an internally reflecting outer prism plate in front of the said polarizer, the whole being secured to the front of the headlight.

11. An article of manufacture for use in connection with a headlight, said headlight having a parabolic reflector, a light emitting element located in front of the reflector, a small spherical reflector in front of the light emitting element, and a flat front cover glass overlying the open front of the reflector, comprising an inner prism plate formed from a disc of glass having a high index of refraction, said disc being provided with a plurality of prisms having 60° apex angles on one face thereof, a randomizing birefringent sheet between the reflector and inner prism plate, comprising a depolarizing member, a multilayered light polarizer in front of the inner plate, and an outer prism plate in front of the said polarizer formed from a disc of glass having a high index of refraction, said disc being provided with a plurality of prisms having 60° apex angles on one face thereof, the whole being secured to the front of the headlight.

12. An article of manufacture for use in connection with a headlight, said headlight having a parabolic reflector, a light emitting element located in front of the reflector, a small spherical reflector in front of the light emitting element, and a flat front cover glass overlying the open front of the reflector, comprising an inner prism plate formed from a disc of transparent material having an index of refraction of 1.732, said disc being provided with a plurality of 60° angled prisms on one face thereof, a light depolarizing member in front of the inner prism plate, a multi-layered light polarizer in front of the depolarizer, and an outer prism plate formed from a disc of transparent material having an index of refraction of 1.732, said disc being provided with a plurality of 60° angled prisms on one face thereof in front of the said polarizer, the whole being secured to the front of the headlight.

13. A device for producing plane polarized illumination comprising, a housing, a source of light in said housing, a light reflecting member disposed behind the light source, a light polarizing member in front of the light source, consisting of a substantially V-shaped beam splitting assembly formed from outwardly diverging transparent sheets, said sheets having coatings thereon of isotropic transparent materials having a thickness of one-quarter wave length, plane reflecting members on each side of and spaced from the transparent sheets to receive and direct that portion of the light which is reflected from the sheets toward the front of the housing and a half-wave retardation plate laterally spaced from the beam splitting assembly and disposed between the plane reflecting members and the front of the housing.

14. A device for producing plane polarized illumination comprising, a housing, a source of light in said housing, a light reflecting member disposed behind the light source, a light polarizing member in front of the light source, consisting of a substantially V-shaped beam splitting assembly formed from outwardly diverging transparent sheet disposed on either side of the longitudinal axis of the light reflecting member and at an angle of approximately 30° with said axis, said sheets having coatings thereon of titanium dioxide of a thickness of one-quarter wave length, plane reflecting members on each side of and spaced from the transparent sheets to receive and direct that portion of the light reflected from the sheets toward the front of the housing and a half-wave retardation plate laterally spaced from the beam splitting assembly and disposed between the plane reflecting members and the front of the housing.

15. A device for producing plane polarized illumination comprising, a housing, a source of light in said housing, a light reflecting member disposed behind the light source, a light polarizing member in front of the light source consisting of a plurality of spaced parallel plates disposed at an angle to the horizontal axis of the light reflecting member, said plates having a coating on at least one side thereof of titanium dioxide, the coating having a thickness of the order of one-quarter wave length.

16. A device for producing plane polarized illumination comprising, a housing, a source of light in said housing, a light reflecting member disposed behind the light source, a light polarizing member in front of the light source consisting of a plurality of spaced parallel plates each disposed at an angle of 15° to the horizontal axis of the light reflecting member, said plates having a coating on at least one side thereof of titanium dioxide, the coating having a thickness of the order of one-quarter wave length.

17. A device for producing plane polarized illumination comprising, a housing, a source of light in said housing, a light reflecting member disposed behind the light source, a light polarizing member in front of the light source consisting of a plurality of spaced parallel plates disposed at an angle to the horizontal axis of the reflector, said plates having a coating on at least one side thereof having an index of refraction in excess of 2.4, the coating having a thickness of the order of one-quarter wave length.

18. A device for producing a high quantitative yield of polarized light comprising, a parabolic reflector, a light source located at the focus of the said parabolic reflector, a multi-layered polarizer having at least one layer having an index of refraction greater than 2.4 disposed in front of the light source at an angle with respect to the longitudinal axis of the parabolic reflector, equal to the complement of the Brewster's angle for said polarizer, a plane reflector spaced from the polarizer and adapted to receive thereon light reflected from the surface of the polarizer, said plane reflector being positioned so as to direct the light impinging thereon along a path which will intersect the beam passing through the poralizer at the point to be illuminated and a half-wave retardation plate in front of the plane reflector and across the beam emanating therefrom.

References Cited in the file of this patent

UNITED STATES PATENTS

| | | |
|---|---|---|
| 1,733,915 | Short | Oct. 29, 1929 |
| 1,858,702 | Chambers | May 17, 1932 |
| 2,180,114 | Land | Nov. 14, 1939 |
| 2,237,565 | Land | Apr. 8, 1941 |
| 2,252,898 | Pollack | Aug. 19, 1941 |
| 2,270,323 | Land et al. | Jan. 20, 1942 |
| 2,287,556 | Land | June 23, 1942 |
| 2,368,099 | Bodde | Jan. 30, 1945 |
| 2,393,970 | Burchell et al. | Feb. 5, 1946 |
| 2,402,176 | Marks | June 18, 1946 |
| 2,403,731 | Mac Neille | July 9, 1946 |
| 2,475,921 | Smith | July 12, 1949 |
| 2,492,809 | Marks | Dec. 27, 1949 |
| 2,493,192 | Grey | Jan. 3, 1950 |
| 2,748,659 | Keffcken et al. | June 5, 1956 |

FOREIGN PATENTS

| | | |
|---|---|---|
| 286,394 | Great Britain | Mar. 8, 1928 |
| 365,082 | Great Britain | Jan. 13, 1932 |
| 457,443 | Great Britain | Nov. 30, 1936 |
| 460,666 | Great Britain | Jan. 28, 1937 |
| 477,598 | Great Britain | Mar. 30, 1936 |